R. J. KENT.
HOOK.
APPLICATION FILED JAN. 20, 1922.

1,420,487.

Patented June 20, 1922.

INVENTOR
R. J. Kent
BY
ATTORNEY

UNITED STATES PATENT OFFICE.

ROBERT J. KENT, OF BROOKLYN, NEW YORK, ASSIGNOR TO AMERICAN TELEPHONE AND TELEGRAPH COMPANY, A CORPORATION OF NEW YORK.

HOOK.

1,420,487.  Specification of Letters Patent.  Patented June 20, 1922.

Application filed January 20, 1922. Serial No. 530,702.

*To all whom it may concern:*

Be it known that I, ROBERT J. KENT, a citizen of the United States, residing at Brooklyn, in the county of Kings and State of New York, have invented certain Improvements in Hooks, of which the following is a specification.

This invention relates to improvements in hooks. The improvement lies in the novel formation of that end of the hook to which a rope, such as a winch rope, may be attached. The object of the invention is to provide a hook for use with such a rope which may be easily and quickly attached to, or detached from, the rope.

Figure 2:
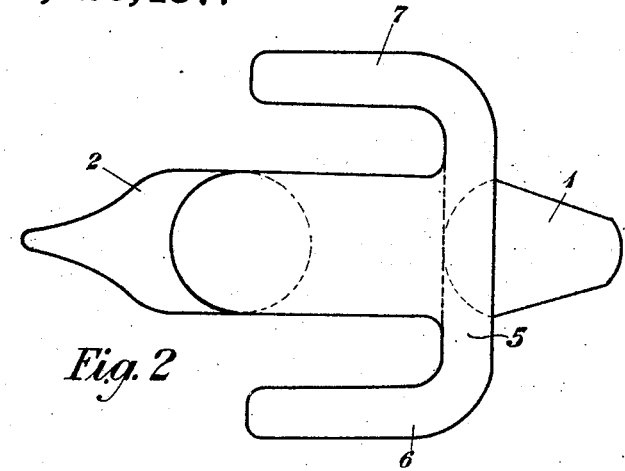
Figure 1:
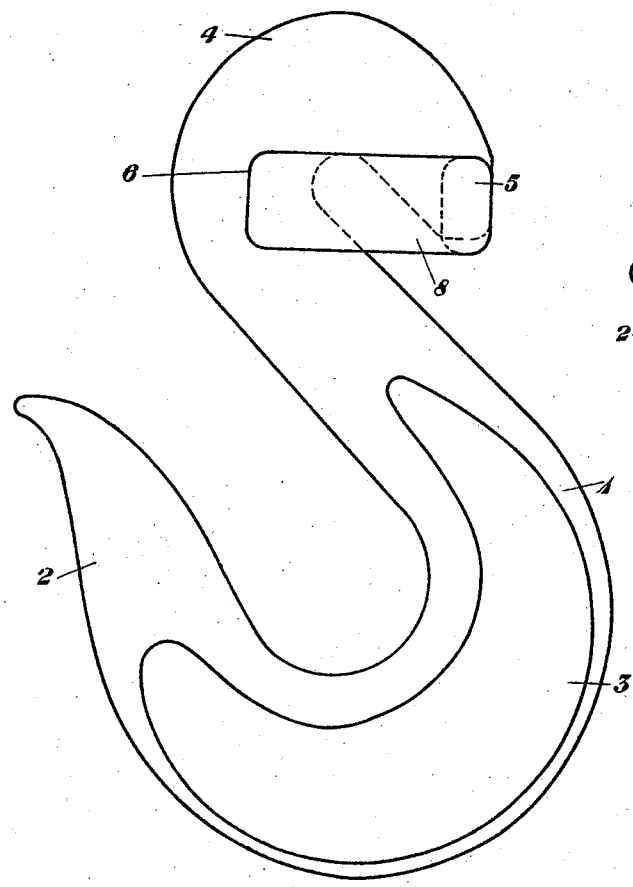

In the accompanying drawing, Figure 1 represents a side elevation of the hook; Fig. 2, a top plan view; and Fig. 3, a view in perspective, with the rope attached. Like numerals of reference in the several views of the drawing designate corresponding parts of the device.

With reference to the details of the drawing, 1 designates the main body and 2 the pointed end of the hook, while 3 is the flattened portion of the side shown, extending continuously over a part of the main body and a part of the pointed end. 4 is the curved portion forming the top of the hook. This portion at its right extremity branches out to extend laterally beyond the main body of the hook, forming the crosspiece 5. This crosspiece in turn is extended from right to left on either side of the hook body, to form the two arms or guards 6 and 7, as most clearly shown in Fig. 2.

Figure 3:
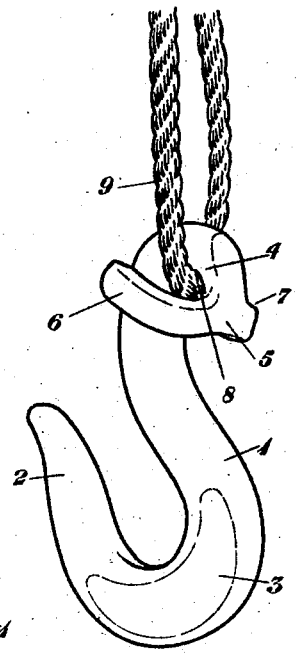

The hook is attached to or detached from the rope by the mere slipping of the hook through the eye of the rope. After attachment, the rope passes through the opening 8, shown by dotted line in Fig. 1, and through the spaces between the hook body and the arms or guards 6 and 7, shown most clearly in Fig. 2. Fig. 3 shows the rope 9 in place after attachment.

The rope loop, thus held in place, is furthermore guarded by the arms 6 and 7. This greatly reduces the wear on the rope when the combination of rope and hook is used for such purposes as dragging poles along the ground.

What is claimed is:

1. A hook comprising a body portion, a lower pointed end, an upper portion curved to form a half loop and to extend downward toward the middle of said body portion, and two arms extending from said upper portion and lying one across either side of said body portion.

2. A hook including a body portion; a lower pointed end; and means for attaching the hook to a rope; said attaching means comprising an upper portion of the hook curved to form a half loop and to extend downward toward the middle of said body portion, and two arms extending from said upper portion and lying one across either side of said body portion.

3. A hook comprising a body portion, a lower pointed end, an upper portion curved to form a half loop and to extend downward toward the middle of said body portion, and two arms extending from said upper portion at its lower extremity and lying one across either side of said body portion.

4. A hook including a body portion; a lower pointed end; and means for attaching the hook to a rope; said attaching means comprising an upper portion of the hook curved to form a half loop and to extend downward toward the middle of said body portion, and two arms extending from said upper portion at its lower extremity and lying one across either side of said body portion.

5. An S-shaped hook comprising a body portion, as the shank of the S; a pointed end, as the lower leg of the S; and two arms extending from the upper leg of the S, one across either side of the shank of the S, whereby the hook may be attached to a rope.

In testimony whereof, I have signed my name to this specification this 18th day of January, 1922.

ROBERT J. KENT.